Oct. 19, 1954

C. L. DAY ET AL 2,692,075

FILLING MACHINE

Filed Sept. 28, 1951

INVENTORS:
Carl L. Day,
Rudolph H. Breeback,
BY
Cushman, Darby & Cushman
ATTORNEYS.

Oct. 19, 1954  C. L. DAY ET AL  2,692,075
FILLING MACHINE
Filed Sept. 28, 1951  7 Sheets-Sheet 3

INVENTORS:
Carl L. Day,
Rudolph H. Breeback,
BY Cushman, Darby & Cushman
ATTORNEYS

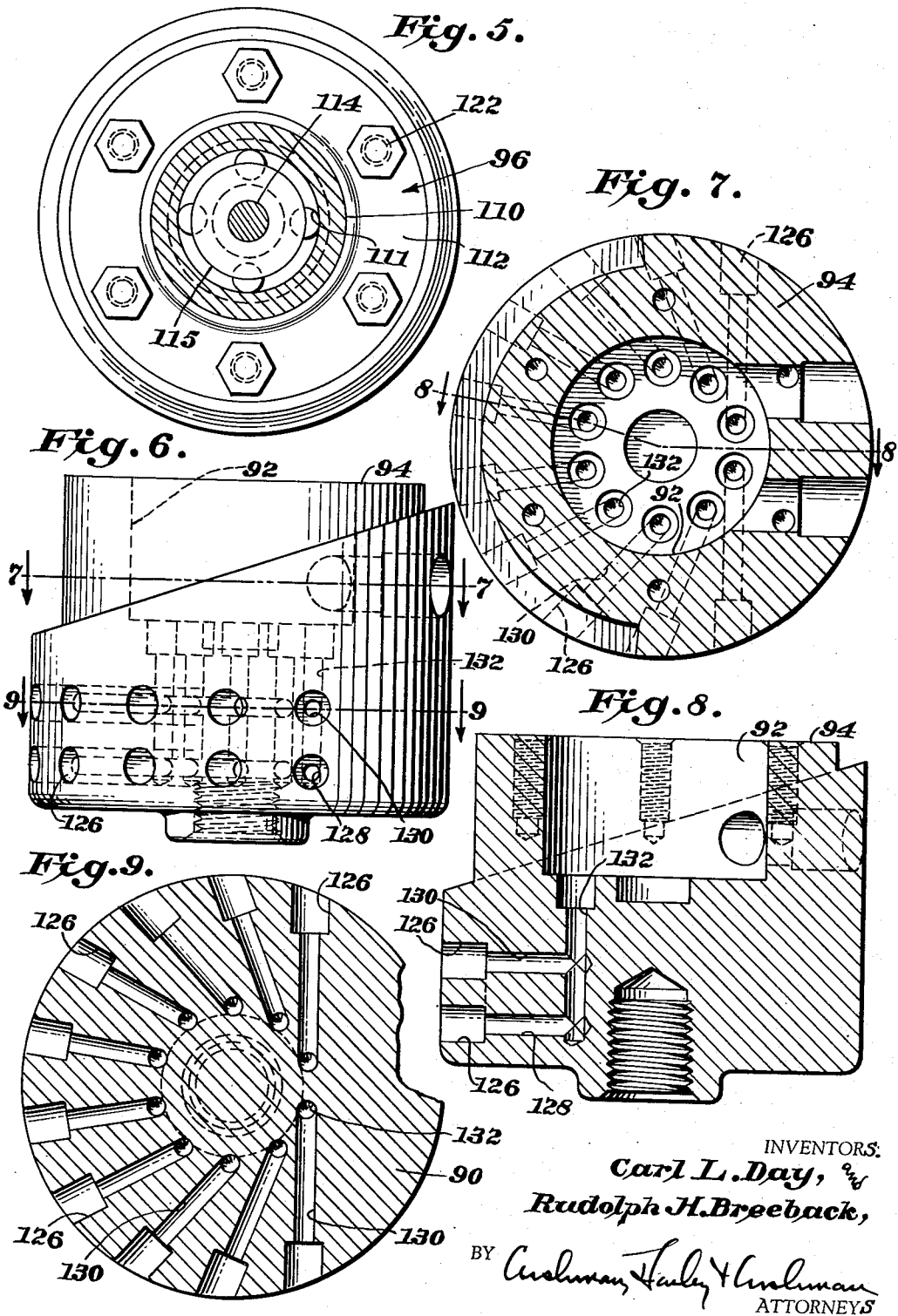

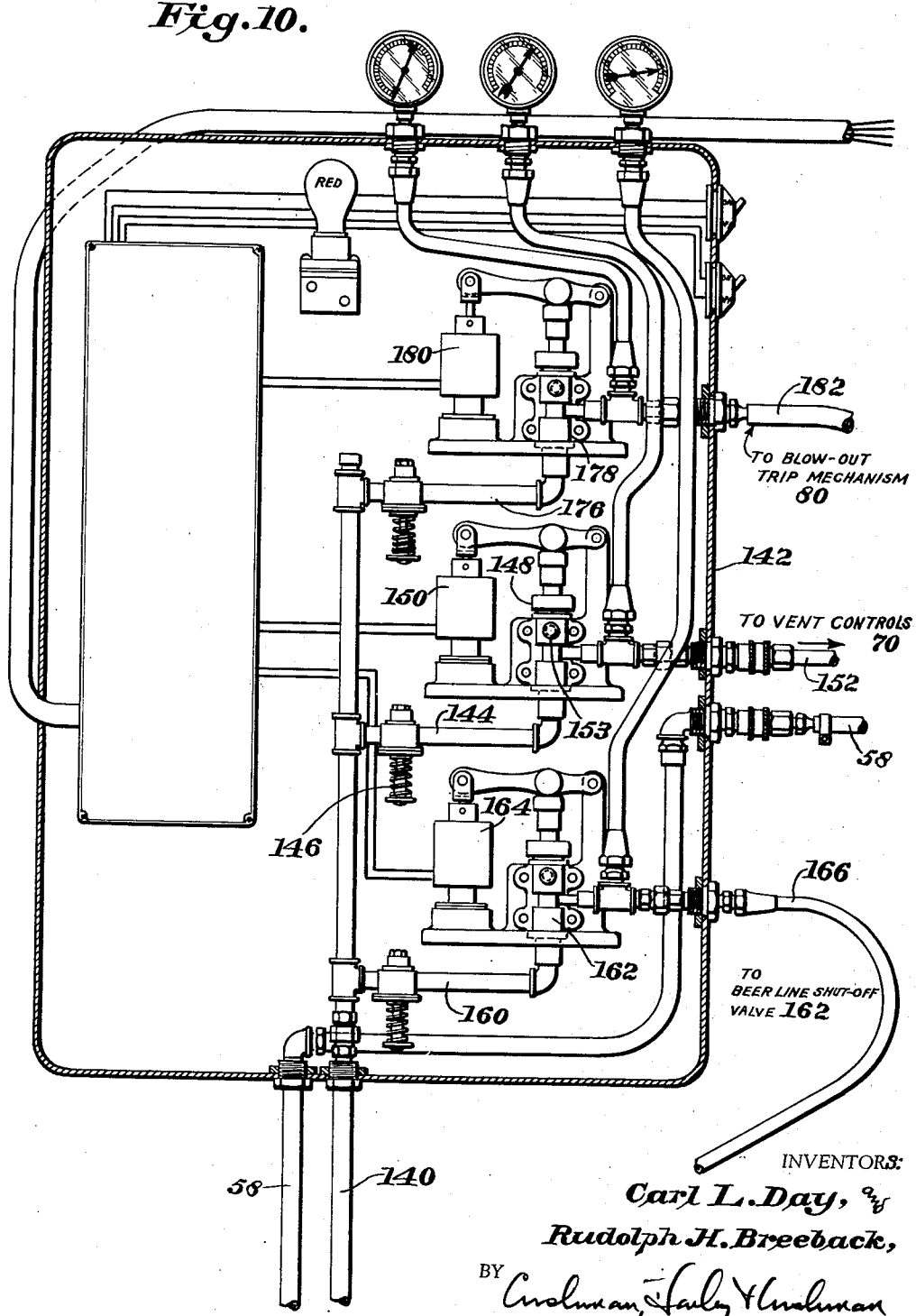

Oct. 19, 1954 C. L. DAY ET AL 2,692,075
FILLING MACHINE
Filed Sept. 28, 1951 7 Sheets-Sheet 6

INVENTORS:
Carl L. Day,
Rudolph H. Breeback,
BY
Cushman, Darby & Cushman
ATTORNEYS.

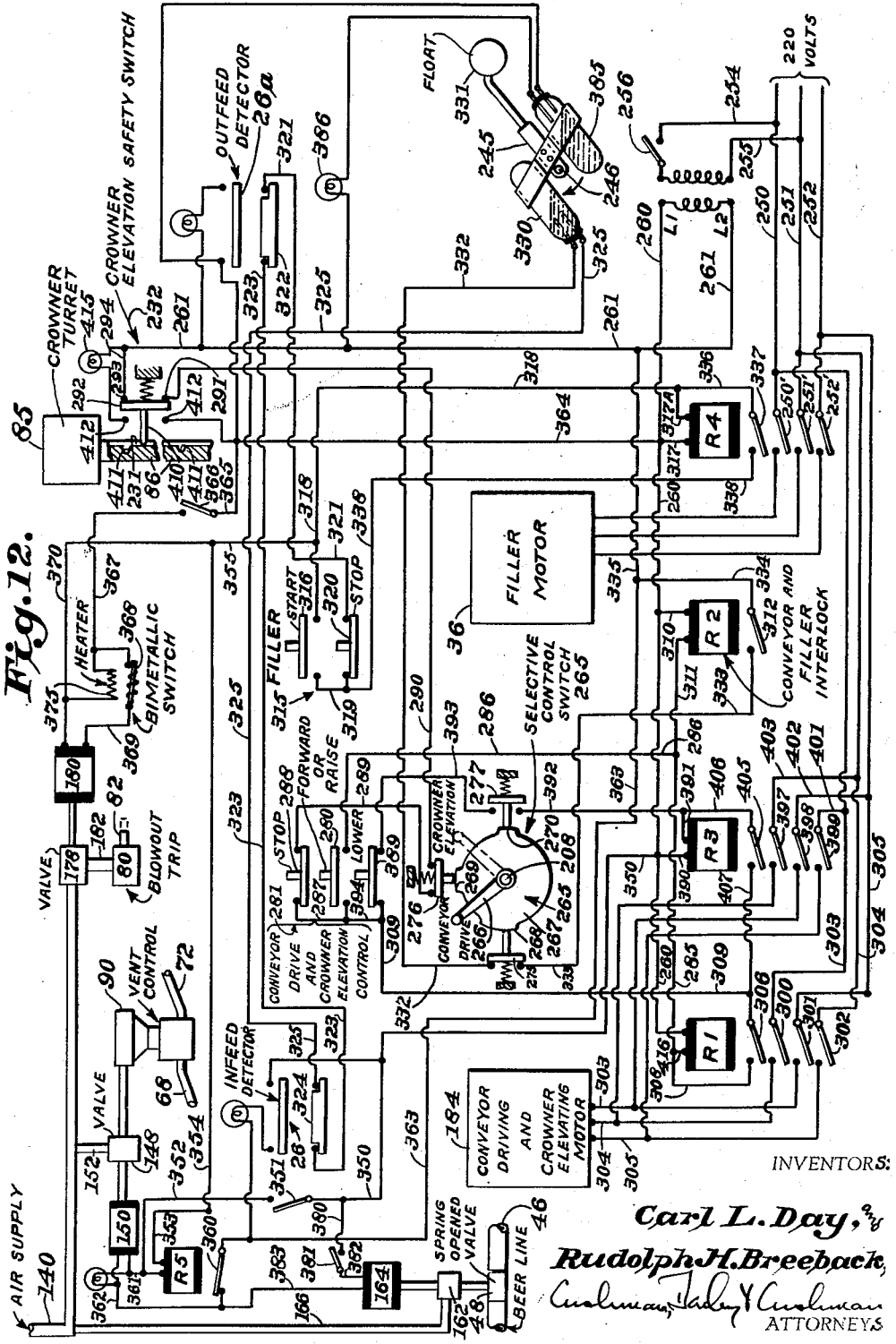

Patented Oct. 19, 1954

2,692,075

UNITED STATES PATENT OFFICE 2,692,075

FILLING MACHINE

Carl L. Day and Rudolph H. Breeback, Baltimore, Md., assignors to Crown Cork & Seal Company, Inc., Baltimore, Md., a corporation of New York Application September 28, 1951, Serial No. 248,722

26 Claims. (Cl. 226—75)

The present invention relates to filling machines and, more particularly, to controls to improve the efficiency of operation of rotary beverage filling machines.

A beer filling machine is hereinafter described to indicate how the invention may be embodied, but application of the invention to other liquid fillers will be apparent to those skilled in the art.

In the filling of beer in bottles or other containers, it is usual to first counterpressure the container; that is, establish in the container a pressure corresponding to the pressure above the beer in the filling reservoir. Then the beer is flowed into the container from the reservoir while the air or other gas originally in the container, plus the counterpressure gas, is returned or vented to the reservoir. When the beer rises in the container to cover the mouth of the return or vent passage leading from the container to the reservoir, the rise of beer in the container will stop because of the pressure thereby locked in the container above the mouth of the vent passage. However, additional beer may move into the container and directly up into the vent passage until the level of beer in the vent passage is the same as in the reservoir.

In normal operation, rise of beer in the vent passage after the container has been filled to the desired height is usually avoided by so timing operations that the filling valve will move to closed position at about the movement that the beer reaches the proper height in the container. However, particular difficulties in this respect occur if rotation of the filling table and reservoir, hereinafter termed "rotary filler," is stopped while the container supporting platforms of the table bear containers in process of being filled.

In more detail, if a rotary filler includes fifty container supporting platforms and filling heads, at any instant in the normal operation of the machine, approximately forty of the containers will have been counter-pressured, and beer will be flowing from the reservoir to those containers, with simultaneous return of vented air and gas from the containers to the reservoir. The height to which any container has been filled at the supposed given moment will depend upon how far that container has travelled past the trip at which the filling head was operated to start beer filling. For example, a container which has just moved past the filling trip will have very little beer in it, while a container which is just about to reach the filling valve shut-off trip will contain beer to the proper filling height. The other containers between these two will contain progressively increasing amounts of beer depending upon how far past the filling trip they have traveled with the rotary filler.

It should be borne in mind that if the rotary filler is stopped at any time, such stoppage of rotation does not change the position of the filling head valves. Instead, every filling head and container will be in the same flow relation to the reservoir as if the filler was still rotating. Hence, the beer in the reservoir will be free to flow by gravity into the containers, with simultaneous return of gas and air from the containers, and all of the containers can continue to fill. In other words, with a fifty head machine stopped, the approximately forty containers to which beer has been flowing will continue to receive beer up to the usual filling height, and it even is possible for the beer to continue to rise in the vent passages up to the height of the body of beer in the reservoir.

It will be obvious that when the machine again starts, and the containers filled during the stoppage are removed, some of the beer which has moved up into the vent passages may drain down into the containers before they move from the filling table. These containers will be overfilled at that moment. If the procedure followed in the bottling plant is to tap the containers before they are capped and to thereby cause foam to rise and drive out headspace air, containers filled above that height may foam uncontrollably so that they will finally have less liquid therein than is desired. Even if tapping is not conducted, the containers will be overfilled, resulting in unfavorable comparisons.

If the stoppage is not long enough to permit beer to rise to an undesirable height in the vent passage of every filling head which is at filling stage, nevertheless, every container probably will overfill when rotation of the filler is resumed.

Even if all of the beer in the vent passages does not drain into the containers, other difficulties arise. For example, it is frequent practice to blow out the vent passage of each filling head after a filled container has been removed therefrom. However, such blow-out procedure is not of sufficient duration to remove beer which has risen to an extreme point in the vent passage. If the vent passage still contains beer after blowout, when an empty container is next placed thereunder and counterpressure flow occurs, full counterpressure may be prevented by the restriction resulting from the presence of the beer, or the beer in the vent passage may be driven down into the container with considerable force so that uncontrollable foaming is initiated to continue after the container leaves the filling head. This results in partially filled containers.

An object of the present invention is to provide a system whereby the flow of liquid into containers at filling stage will be stopped whenever rotation of the rotary filler is stopped.

In general terms, the invention involves closing the vent passages whenever rotation of the filler is stopped, and with the vent shut-off or control so designed that no substantial number of adjacent containers will be in communication with each other through their flow passages. We have found that unless provision is made to prevent exchange of pressure between the containers, they still can fill to the usual point and liquid can move up into the vent passages.

Another difficulty which has arisen from the stopping of a rotary filler is that if the beer or other liquid is still free to flow from the reservoir to the containers, the pressure in the reservoir will change because the beer flow is not at the normal rate. Usually, the liquid continues to rise in the reservoir to a greater than normal level, with the result that the pressure of the gas in the top of the reservoir increases. When rotation is again resumed, this higher gas pressure affects the filling of the immediately succeeding containers until the pressure in the reservoir becomes normal. Containers filled under greater than normal pressure are apt to foam to an undesirable extent and thereby have an incorrect level.

Another object of the invention is to provide means to close the reservoir liquid supply line whenever rotation of the filler is stopped.

A further object of the invention is to provide means to insure that at least every filling head will have its vent passage blown out whenever rotation of the filler is started. In some plants, each filling machine is equipped with blow-out mechanism, but the mechanism is not actuated to operative position if conditions do not warrant its use. Use at all times can result in undue loss of carbon dioxide gas blown from the reservoir to atmosphere by the blow-out operation. Nevertheless, whenever rotation of the filler is stopped, it is desirable to insure that the blow-out mechanism will be operative for at least the period of time required for blowing out every filling head on the machine.

An additional object of the present invention is to insure that the blow-out device will be placed in operative position for a predetermined period of time whenever rotation of the filler is started.

Another object of the invention is to provide power means for raising and lowering the capping or crowning heads of a filling machine.

Hand operation of raising and lowering the capping heads of a filling machine of large capacity involves considerable time and effort. However, the provision of a motor solely for this purpose and not intended for use at any other time increases the cost of the machine.

Another object of the invention involves providing a filling machine with a motor which alternately can be used to drive the usual infeed conveyor or to raise and lower the capping mechanism.

It will be percevied that attainment of the above object provides power means to raise and lower the capping mechanism but without undue provision of motor equipment on the machine.

Another object of the invention is to provide control arrangements whereby rotation of the filler will be prevented whenever the capping mechanism raising and lowering controls are effective.

Other objects and advantages of the invention will be apparent from the following specification and accompanying drawings.

In the drawings:

Figure 5 is a horizontal section on the line 5—5 of Figure 3.

Figure 6 is a detail elevation showing an element of the vent control valve structure.

Figure 7 is a horizontal section on the line 7—7 of Figure 6.

Figure 8 is a vertical section on the angled line 8—8 of Figure 7.

Figure 9 is a horizontal section on the line 9—9 of Figure 6.

Figure 10 is an elevation of solenoid operated valves to control the flow of operating fluid in accordance with the control system of the invention.

Figure 12 is a diagrammatic view showing electrical circuits and mechanical controls included in the invention.

Figure 1:
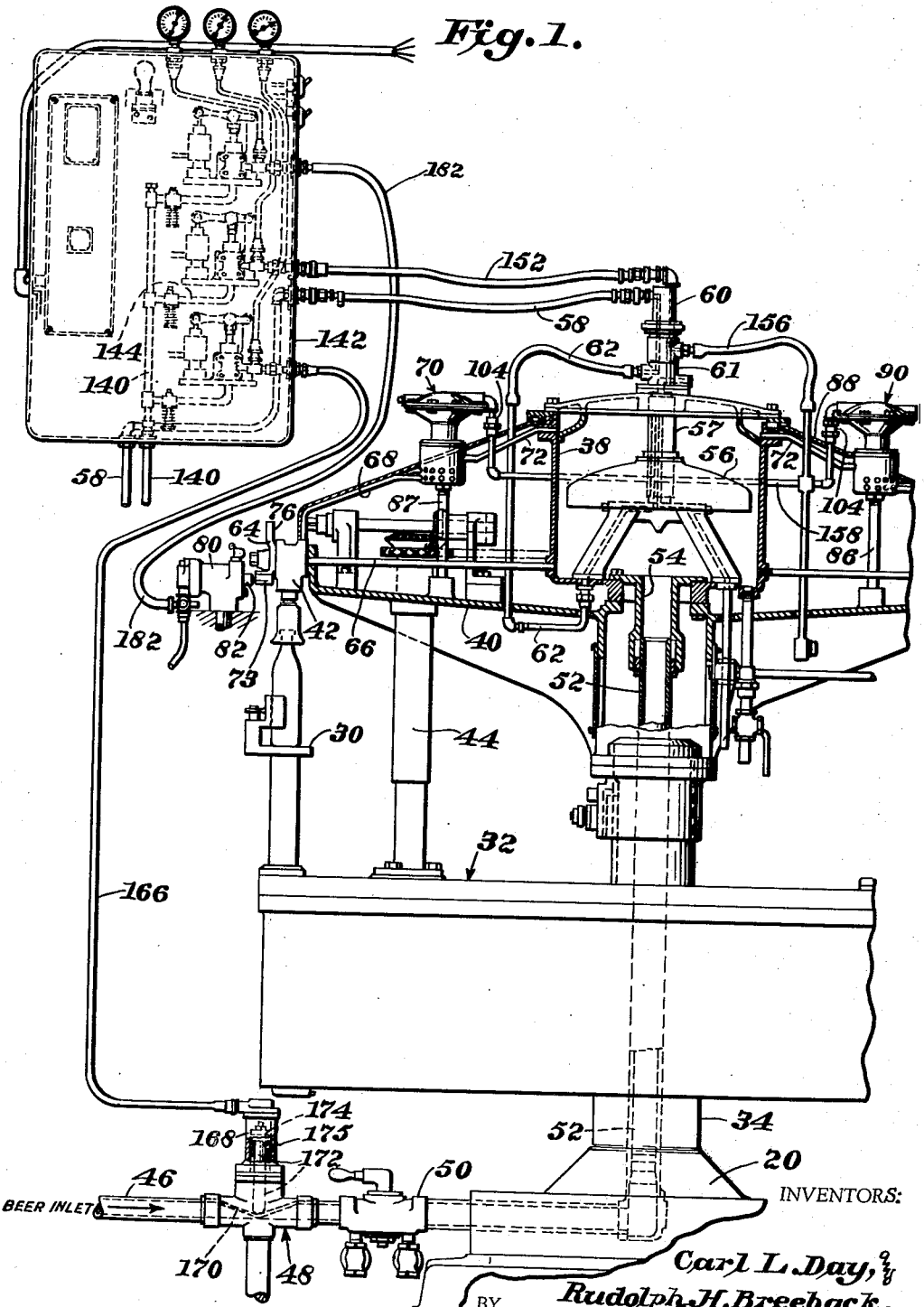
Figure 1 is a view showing the lower portion of the rotary filling table, that is, rotary filler, in elevation, with certain details omitted. The view shows the upper portion of the rotary filler in axial section and various elements of the piping are shown diagrammatically.

The beer filling machine disclosed herein is of the type disclosed in the patents of Robert J. Stewart and Wiltie J. Gladfelter, Nos. 2,097,107 and 2,202,033 for Filling Machines, issued October 26, 1937, and May 28, 1940, respectively. In more detail, referring to Figures 1 and 2, the machine includes a stationary base or housing 20 upon which is fixed a work table 22. In accordance with usual practice, the bottles or other containers to be filled will move into the machine on the straight line endless conveyor 24 having its upper run flush with the upper surface of the work table 22. The containers will move through a container infeed jam detector mechanism 26 of usual type to an infeed dial 28 which positions the containers on the container supporting platforms 30 which are vertically reciprocable in the rotary filling table 32.

Figure 2:
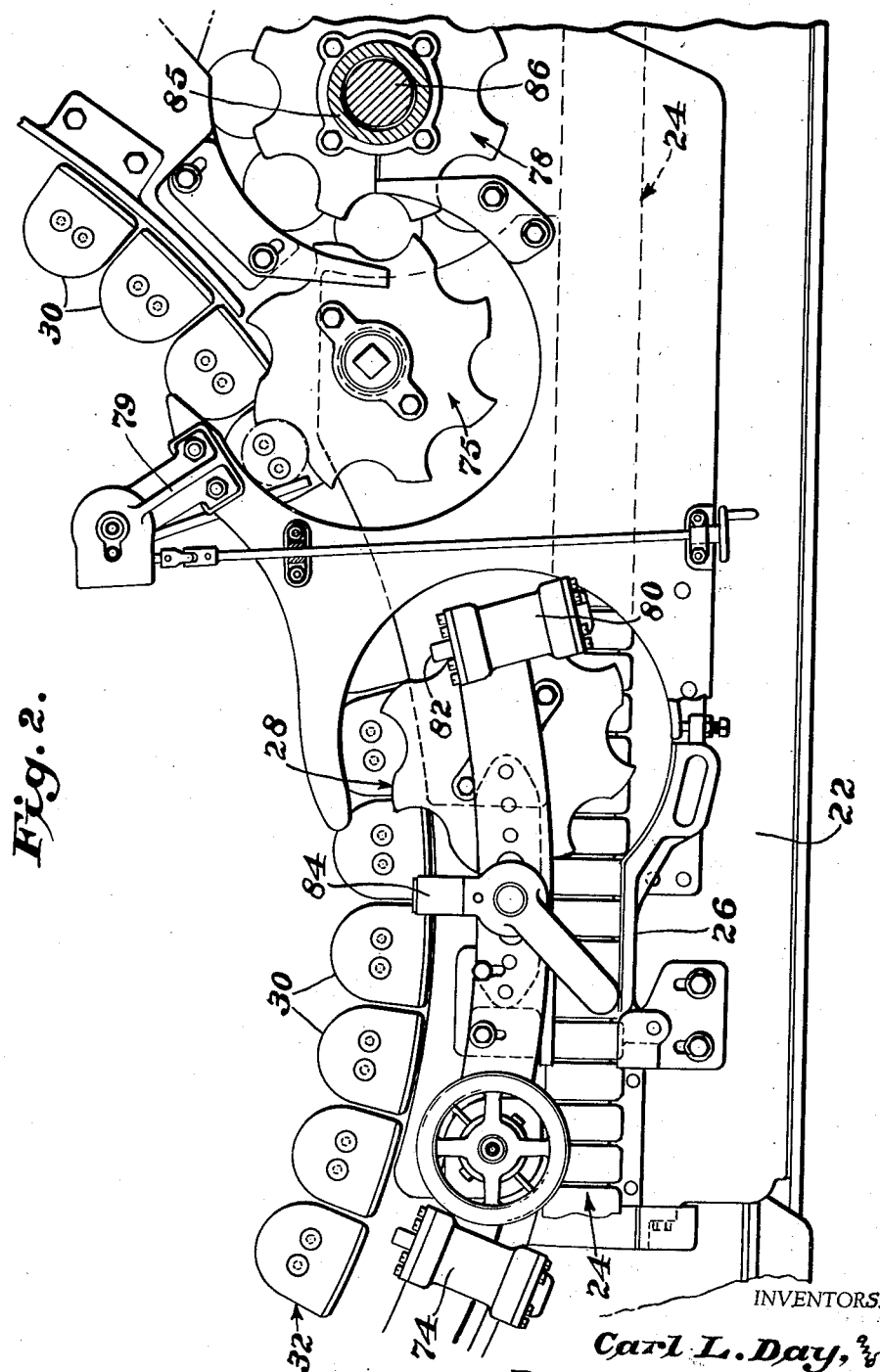
Figure 2 shows the portion of the stationary or work table in plan, a fragment of the rotary filling table also being included in the view.

The filling table 32 of the rotary filler is rotatable with respect to the stationary column 34 of base 20, being driven in a clockwise direction as viewed in Figure 2 through suitable gearing, not shown, by means of a motor 36 diagrammatically indicated in Figure 12. A filling reservoir 38 is rotatable with filling table 32, reservoir 38 being positioned above the filling table as illustrated in Figure 1 and having an apron 40 extending horizontally therefrom by a radius substantially equal to that of filling table 32. At its periphery, apron 40 supports a circumferential series of filling heads 42, one vertically aligned with each of the container supporting platforms 30.

The reservoir 38 may be vertically adjustable with respect to the filling table 32 by means of mechanism such as disclosed in Robert J. Stewart Patent No. 2,362,167, issued November 7, 1944, for Supporting Structure of Beverage Filling Machines. Such adjusting mechanism includes the telescopic posts designated 44 in Figure 1.

Assuming that the machine is to be used to fill containers with beer, the beer will flow to the machine from a Government vat through piping 46 indicated in the lower left-hand portion of Figure 1 and past an automatically controlled beer valve 48 and a manual valve 50. Pipe line 46 is connected within the base of the machine to a stationary pipe 52 extending upwardly through central column 34. A tube 54 depending centrally from reservoir 38 is telescopically connected in liquid-tight relation to the upper end of pipe 52.

Reservoir 38 includes a float 56 which operates valve mechanism 57 of the type disclosed in said Stewart and Gladfelter patent and in Rudolph H. Breeback application for Filling System, Serial No. 173,503, filed July 13, 1950. As is disclosed in said Breeback application, air or carbon dioxide gas is delivered to the machine by a line 58 shown in Figure 1 and which joins a fitting 60 mounted in swivelled relation to the axis of the upper wall of reservoir 38. As is customary, fitting 60 is held against rotation, and the reservoir rotates with respect thereto. Fitting 60 includes a passage leading to an annular groove in a sleeve 61 rotatable with reservoir 38. A pipe 62 open to the groove passes exteriorly of reservoir 38 to the lower wall of the reservoir to supply air or gas to the latter through the valve mechanism under control of float 56. The valve mechanism 57 will insure that the proper height of beer is maintained within the reservoir and also that the pressure of air or gas in the reservoir above the beer will be constant.

Still referring to Figures 1 and 2, the filling heads 42 may be of the type disclosed in Rudolph H. Breeback application for Filling Head, Serial No. 213,950, filed March 5, 1951, or in said patents. That is, each filling head 42 will include a valve 64 of the rotary disc type operable to various positions by trips as hereinafter described. Each filling head 42 will receive beer from reservoir 38 through a pipe 66, one extending from each filling head 42 to the lower portion of reservoir 38. Each filling head also will have a pipe 68 extending therefrom to a vent control valve mechanism 70 suitably supported on the apron 40 adjacent reservoir 38. The machine preferably will be provided with several vent control valve mechanisms 70, each being connected by lines 68 to a group of the filling heads 42. For example, if the machine is provided with fifty filling heads 42, each valve mechanism 70 will be connected to sixteen or seventeen filling heads.

Each vent control mechanism 70 has a pipe 72 extending therefrom to the upper portion of reservoir 38. The pipe 72, vent control valve mechanism 70 and the pipe 68 leading to each filling head 42 comprise a means for permitting counterpressure gas to flow to each filling head from the reservoir and also for the return of gas and air from the container and filling head during the filling of the container in accordance with the usual counterpressure filling system.

In conformity with the usual practice followed in the filling of beer, a moment after an empty container is placed upon a filling platform 30 by the infeed dial 28, the platform will be elevated to the position illustrated in Figure 1 so that the mouth of the container on the platform will be sealed to the filling head 42, the nozzle of the filling head then depending into the bottle. Immediately after the container is thus sealed to the filling head 42, the lower arm 73 of the disc-type filling valve 64 will contact with a counterpressure trip 74 (Figure 2). Because the filler is rotating, the vent control valve mechanisms 70 will be in open or flow position at this time and, therefore, gas will flow from the upper portion of the reservoir 38 through pipe 72 and through the corresponding vent control mechanism to the pipe 68 leading to the filling head in question so that the pressure in the container will be equalized with the pressure above the beer in reservoir 38.

A further brief rotation of the container supporting platform 30 with the filling table 32 will cause the lower arm 73 of disc valve 64 to contact with a filling trip as described in said patents so that the disc valve 64 will be operated to permit beer to flow through line 66 to the filling head and thence downwardly by gravity through the filling nozzle into the container. During this filling stage, the disc valve 64 also will connect the upper portion of the container to the upper portion of the reservoir 38 through the line 68 as described in said patents and applications, and thence by vent control valve mechanism 70 and line 72. Hence, the counterpressure originally established in the container will be vented back to the reservoir as the container is filled. The operation of the vent control valve mechanisms 70 to stop flow of beer to the bottles is hereinafter described.

The rotation of a container supported upon a filling platform 30 with the filling table will continue until the platform comes adjacent the outfeed dial 75 illustrated in Figure 2. However, just before the container reaches the outfeed dial, the upper arm 76 (Figure 1) of the disc valve 64 will contact with a neutral or closing trip, not shown, which will operate the valve to closed or neutral position wherein the filling head 42 and container will be completely closed off from the reservoir 38. In accordance with usual practice, the neutral or closing trip will be so positioned that, at this moment, even the slowest flowing filling head 42 will have supplied sufficient beer to its container to fill the container to the desired filling height. Then the platform 30 will lower, and the container will be engaged by the outfeed dial 75 which will move it to the rotary crowning or cap applying mechanism generally designated 78 so that the container will be capped. Then the container will be engaged by a rotary dial, not shown, which will replace it upon the outfeed end of conveyor 24 for removal from the machine.

A tapping mechanism 79 of well-known form may be supported on work table 22 adjacent outfeed dial 75 to tap the containers to create foam to drive out headspace air.

As is hereinafter described in detail, the machine may be provided with a blow-out mechanism 80 shown in Figure 2 and supported upon work table 22 between the outfeed dial 75 and infeed dial 28. When the plunger 82 of blow-out trip mechanism 80 is in outward position as is hereinafter described, the lower arm 73 of each disc valve 64 will contact therewith to rotate the valve to a position wherein line 68 will be open to atmosphere so that a small charge of the gas in the reservoir 38 may flow through the corresponding pipe 72, vent control mechanism 70, and line 68 to thereby blow liquid from the gas passages of the filling head as described in said Breeback application Serial No. 213,950. A very brief continued rotation of the filling table 32 will cause the upper arm 76 of the disc valve 64 to contact with a closing trip 84 which will cause the disc valve to be returned to neutral or closed position. While the above blow-out is occurring, an empty container will have been placed upon the platform 30 by dial 32, and the empty container will move through the filling cycle described above.

The capping mechanism 78 is of usual type except for the power elevating means hereinafter described. Its turret 85 which carries the vertically reciprocable capping heads is rotatably journaled upon a vertically movable post 86. The capping mechanism and the various dials are geared to the filling table or its drive so that they will be driven by filler motor 36 indicated in Figure 12.

The vent control valve mechanisms 70

A vent control valve mechanism 70 is illustrated in Figures 3 to 9. As has been indicated above, a filling machine provided with fifty filling heads 42 will be equipped with three vent control valve mechanisms 70, each mechanism 70 then controlling sixteen or seventeen of the filling heads. In other words, three mechanisms 70 will be equidistantly spaced about the reservoir 38 so that an arcuate group of filling heads 42 can be controlled by each mechanism 70.

The manner of mounting the vent control mechanisms 70 is best indicated in Figure 1 from which it will be observed that each mechanism is threaded upon the upper end of a stud 87 secured at its lower end to the reservoir apron 40. As is subsequently described in detail, each mechanism 70 projects through a skirt 88 which extends from the upper portion of the reservoir 38 to the periphery of apron 40.

Each mechanism 70 comprises a lower body portion 90 provided with a central downwardly facing threaded socket to receive the upper end of the stud 86, the body 90 being substantially cup-shaped to provide a central chamber 92 defined by an upwardly projecting annular flange 94. A diaphragm housing 96 is fitted upon the upper end of the body 90, diaphragm housing 96 being formed of two hollow elements 98 and 100, with a diaphragm 102 sealed between their edges. A pipe 104 is connected to the upper element 100 of the diaphragm housing to enable pressure to be exerted upon the diaphragm by the controls hereinafter described.

The lower element 98 of the diaphragm housing is provided with a bore 106 of somewhat smaller diameter than the chamber 92 and a plunger 108 secured to the center of the diaphragm projects through this bore. A guide plate 110 is interposed between the lower flange 112 of element 98 and the flange 94 of body 90, the plate 110 being provided with a central bore 114 including a boss 115 at its upper end, the bore thus serving as a guide for the stem 108. Plate 110 also includes a plurality of apertures 111 best shown in Figure 5 so that the chamber 92 will be open to the underside of the diaphragm 102. At its lower end, stem 108 has a disc valve 116 secured thereto, the valve being of slightly less diameter than the chamber 92.

Figure 3:
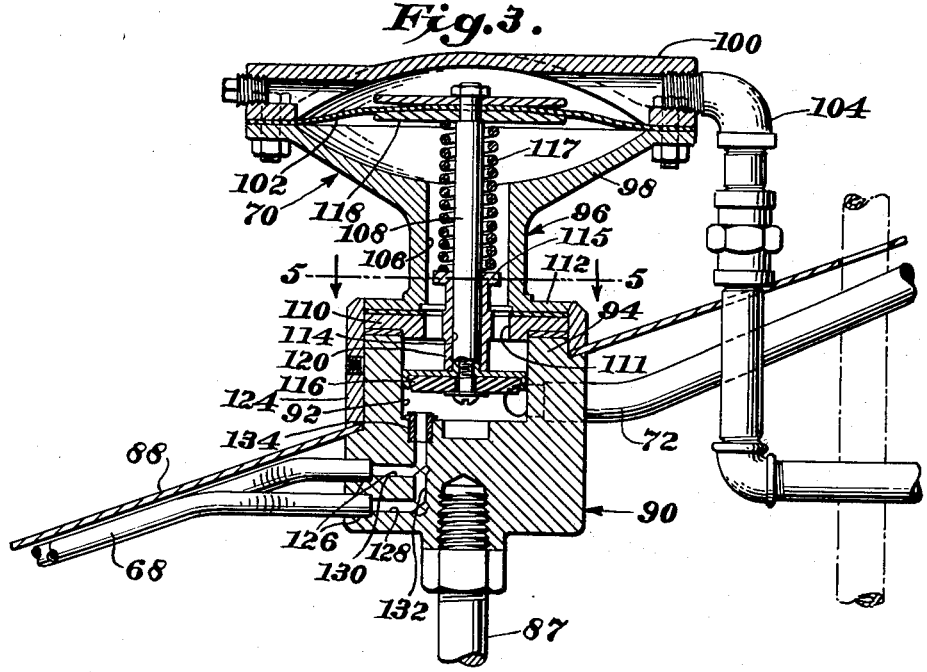
Figure 3 is an axial section of a vent control valve structure included in the present invention.
Figure 4:
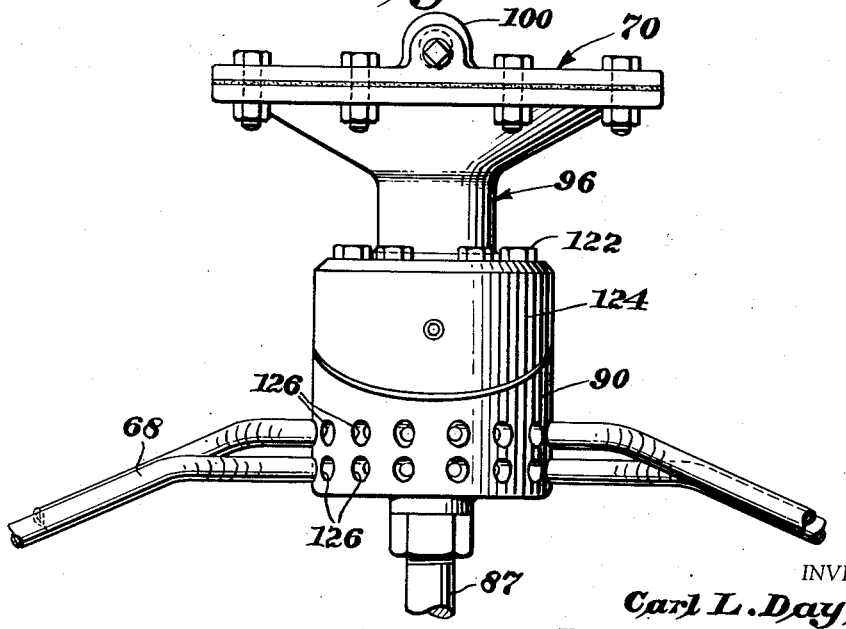
Figure 4 shows the structure of Figure 3 in elevation, with some piping omitted.

A coil spring 117 positioned between the upper end of boss 115 and the undersurface of the diaphragm plate 118 normally urges the stem 108 and valve 116 to the upward position illustrated in Figure 3. Upward movement of valve 116 is limited by a depending flange 120 of plate 110. The pipe 72 which extends from the upper portion of reservoir 38 to each mechanism 70 opens to the lower portion of chamber 92, and it will be observed from Figure 3 that when valve 116 is in its upward limit position, flow through pipe 72 will be unimpeded.

The diaphragm housing 96 is secured to the upper portion of body 90 of vent control valve mechanism 70 by means of machine screws 122 extending through the lower flange 112 of housing 96 and into the upstanding flange 94 of body 90. It will be noted from the drawings that body 90 is so formed that it will snugly fit into apertures in inclined skirt 88. A collar 124 may be mounted upon body 90 to bear upon the upper surface of skirt 88.

The plurality of tubes 68 which extend from a group of filling heads 42 to vent each vent control mechanism 70 are respectively secured in countersunk bores 126 arranged in upper and lower series to face the adjacent group of filling heads 42. Thus, as will be clear from Figures 7 and 9, the tubes 68 may diverge from the counterbores 126 of each body element 90 in a fan-like series. While the counter-bores 126 may be arranged in upper and lower groups, one counter-bore of each group is vertically aligned with a counter-bore of the other group. The counter-bores 126 of the lower group open to horizontally extending bores 128, while the counter-bores 126 of the upper group open to horizontal bores 130. Because each bore 128 is parallel with an upper bore 130, both bores may open to a vertical bore 132 which extends from bore 128 upwardly to the lower wall of chamber 92. At its upper end, each bore 132 has a collar 134 secured therein for engagement by the valve 116.

It will be apparent that when valve 116 is in the raised position illustrated in Figure 3, the flow of gas and air between reservoir 38 and the filling heads 42 will be unimpeded, but that when valve 116 is moved downwardly against the action of spring 117 by pressure existing above diaphragm 102, valve 116 will engage the upper ends of the collars 134 to thereby close off the tubes 68 from the pipe 72 leading to reservoir 38. If the tubes 68 open to the bores 132 in tandem as illustrated in the drawings, the tubes 68 of two adjacent filling heads will be open to each other when valve 116 is closed. However, if desired, each tube 68 may open to a vertical bore 132 independently of an adjacent tube 68 so that the tube 68 of each filling head will be isolated from the tube 68 of every other when valve 116 is closed.

As has been indicated above, the present invention contemplates a system of automatically closing the valves 116 whenever rotation of the reservoir 38 and filling table 32 is stopped and reopening the valves 116 when the machine is restarted. The mechanism provided for this purpose is described immediately below.

Whenever the disc valves 116 of the vent controls 90 are closed, the return flow of counterpressure from each container to the reservoir will be stopped, and the gravity flow of beer to each container likewise will be stopped. In other words, the gas pressure now locked in each container will prevent any more beer from entering the container.

Referring to Figures 10 and 1, the machine is supplied with operating fluid such as compressed air through a line 140. Line 140 extends from a suitable source to a control box 142 which may be mounted above the work table 22 of the machine. Within box 142, a branch line 144 diverges from line 140 and, as best shown in Figure 10, line 144 is provided with an adjustable pressure regulating valve 146. Line 144 extends to a double acting valve 148 controlled by a solenoid 140. A line 152 extends from valve 148 to the fitting 60 swiveled above reservoir 38, and a bore within fitting 60 opens to a circumferential groove within the collar 61 which rotates with reservoir 38 and the remainder of the rotary filler structures. A pipe 156 opens to the just-mentioned groove, pipe 156 extending below apron 88 to join branch types such as 158 which extend to the pressure feeding pipes 104 of the various vent control mechanisms 90. It will be observed that the above piping arrangements enable the branch supply pipe 152 to be constantly open to the pipe 104 of each mechanism 90 so that the pressure above the diaphragm 102 of each mechanism 90 will be controlled by the double acting valve 148.

Valve 148 is operated to one position by the solenoid 150 and to its other position by a spring, not shown. As is hereinafter explained in more detail, when solenoid 150 is energized, valve 148 will be operated to permit compressed air to flow from lines 140 and 144 to line 152 and thence to act upon the upper surface of the diaphragm 102 of each vent control valve mechanism 90 so that the valve 116 of each mechanism will close. Solenoid 150 will be energized whenever rotation of the reservoir 38 and filling table 32 is stopped, so that the valves 116 will close immediately with a snap action. The spring within valve 148 will operate it to close line 144 from line 152 and place line 152 in communication with the atmosphere through a port 153 of valve 148 so that pressure will be quickly exhaused from above each of the diaphragms 102 so that the valves 116 immediately will be moved upwardly with a snap action by spring 117. Gas flow communication between reservoir 38 and each of the filling heads 42 thereby will be restored.

The circuits for controlling solenoid 150 are hereinafter described under the heading "Filler Rotation Condition."

*The automatic beer valve 48*

Automatic beer valve 48 in beer line 46 (Figure 1) enables the flow of beer to reservoir 38 to be promptly stopped whenever rotation of the rotary filler is stopped. In more detail, and as best shown in Figure 10, a branch line 160 extends from air supply line 140 to a double acting valve 162 controlled by a solenoid 164. A line 166 leads from valve 162 to a cylinder 168 (lower part of Figure 1) forming part of valve 48. As is indicated in dotted lines in Figure 1, valve 48 includes a flexible diaphragm 170 and a plunger 172 fixed to a piston 174 within cylinder 168 is adapted to press upon diaphragm 170 in such manner as to stop flow through valve 48. Thus, the flow of beer to reservoir 38 will be cut off whenever actuating fluid is delivered to cylinder 168. With flow of beer to the containers stopped by the closing of the vent control disc valves 116 and flow of beer to reservoir 38 also stopped, the gas pressure and head of beer throughout the filler will be static. When the pressure in the cylinder is released, plunger 174 will be raised by a coil spring 175 so that flow of beer to the reservoir will resume. With the vent control mechanisms 70 simultaneously operated to permit venting from the containers to the reservoir to resume, the filling can proceed under the same conditions as existed when rotation was stopped.

The double acting valve 162 is of the same type as the double acting valve 148 described above. Solenoid 164 will be energized immediately rotation of the filler is stopped. Valve 162 thereby will be operated to permit flow of compressed air by lines 140, 160, and 166 to cylinder 168 of valve 48. The solenoid will be de-energized when the rotary filler re-starts rotation, and a spring within valve 162 will move the valve to its opposite position so that lines 140 and 160 will be closed from line 166, and line 166 will drain to atmosphere through an exhaust port 153 in valve 162. The circuits provided for this purpose are hereinafter described.

Simultaneously with the release of air from above piston 174, the spring 175 will move the piston and plunger upwardly so that diaphragm 170 will raise to permit flow of beer.

*Blow-out mechanism 80*

As has been indicated above, whenever rotation of reservoir 38 and filling table 32 is stopped, some beer may flow up into the vent and counterpressure passage of such filling heads as have their disc valves 64 in the filling stage position. While the provision on the present machine of the vent controls 70 to close the vent tubes 68 when the filler stops largely obviates such flow of liquid up into the filling head passages during a stoppage, nevertheless, under some operating conditions, it may be desirable to blow out the vent passage of each filling head whenever rotation of the filler is resumed after a stoppage of rotation. The present invention includes the means described below which will hold the blow-out trip 82 in valve operating position for a predetermined interval of time whenever rotation of the machine is started. Ordinarily, the blow-out trip 82 need only be held in valve actuating position for a period corresponding to that required for one rotation of the filler.

In order to move and hold the blow-out trip 82 of Figure 2 in valve actuating position, compressed air is supplied from line 140 of Figures 1 and 10 through a branch line 176 to a double acting valve 178 (Figure 10) controlled by a solenoid 180. A line 182 leads from valve 178 to a cylinder within the blow-out fitting 80 so that pressure moving through line 182 will act upon a piston to which trip 82 is secured. A spring within the fitting normally will hold trip 82 in the outward or inoperative position indicated in Figure 1 so that the disc valves 64 will not contact therewith.

The manner of operating double acting valve 178 to permit compressed air to act within the fitting 80 to move trip 82 to valve actuating position is hereinafter described in connection with the control circuits of the machine. However, it may be stated at this time that whenever the machine is started, solenoid 180 will be energized to so operate valve 178 that compressed air will move from lines 140 and 176 to line 182 to move the trip 82 to operative position. After a predetermined period of time, solenoid 180 will be de-energized so that a spring within valve 178 will move it to its opposite position so that lines 140 and 176 will be closed from line 182, and line 182 will drain to atmosphere through valve 178 to permit the spring within fitting 80 to retract trip 82 to non-valve actuating position.

Crowner elevation mechanism

Figure 11:
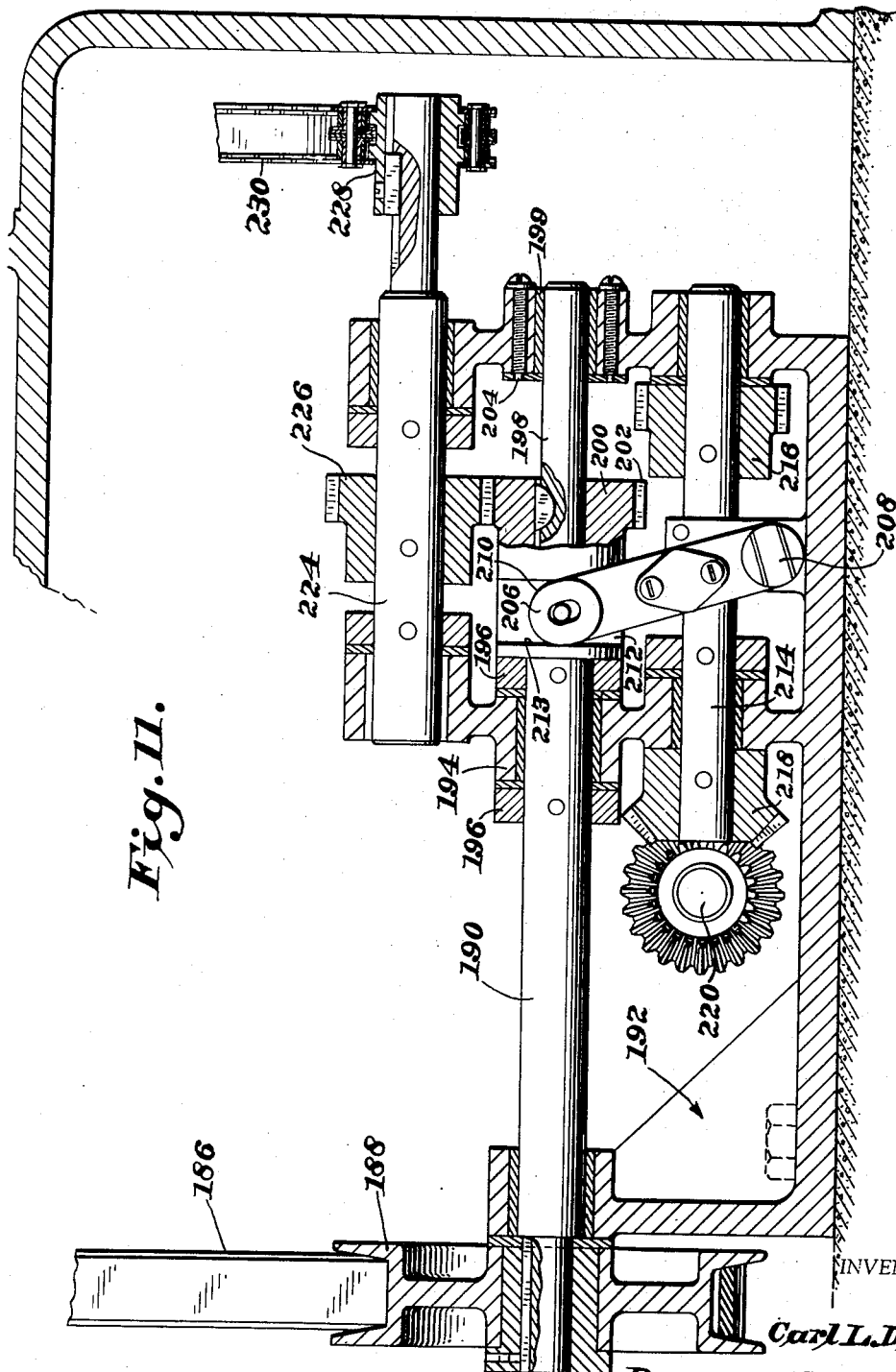
Figure 11 is a detail elevation showing the drive change gearing.

As has been indicated above, the machine disclosed herein includes a motor 36 which rotates the filler, capping mechanism 78 and various rotary dials and drives the other mechanisms (except conveyor 24) usually driven by the filling machine motor. However, the present invention involves provision of a separate motor 184 selectively connectable (a) to drive the container conveyor 24, or (b) to raise and lower the crowning turret 85 of the crowning mechanism 78. The gear changing mechanism of Figure 11 is provided to permit power from motor 184 to be delivered either to conveyor 24 or to the capper elevating mechanism. The motor 184 indicated in Figure 12 may be suitably mounted within the base of the machine and a belt 186 extends from a gear reduction unit associated with the motor. Belt 186 drives a pulley 188 fixed to a shaft 190 journalled for rotation in the bracket 192 of Figure 11.

Shaft 190 has the pulley 188 fixed to one end thereof. Intermediate its length, shaft 190 is journaled in a bearing 194 of bracket 192. A collar 196 is pinned to shaft 190 at each face of journal 194 to hold shaft 190 against axial movement. Beyond or to the right of the collars 196, shaft 190 is of reduced diameter as indicated at 198, and this end of the shaft is journalled at 199. A collar 200 including a pinion 202 is keyed to the reduced portion 198 of drive shaft 190 by means of a keyway permitting collar 200 to move along shaft 190 from the position illustrated in Figure 11 to a position wherein the shiftable pinion 202 will be in contact with a wear plate 204 fixed adjacent journal 199. Collar 200 and pinion 202 are moved between the positions described immediately above by means of a yoke element 206 pivoted to bracket 192 by means of a rod 208. The yoke 206 is operatively connected to the collar 200 by virtue of slots in the yoke which engage diametrically extending pins 210 fixed to a ring 212 mounted in a groove 213 which surrounds collar 200. Hence, collar 200 may rotate with respect to ring 212.

The bracket 192 has a driven shaft 214 journalled therein parallel to shaft 190. Shaft 214 has a pinion 216 pinned thereto adjacent one end. Shaft 214 also has a beveled gear 218 pinned to its opposite end, gear 218 engaging a beveled gear fixed to a shaft 220. Shaft 220 extends to the gearing for elevating the crowner. Such gearing may be of the type disclosed in said Stewart and Gladfelter Patent No. 2,202,033 to include a worm gear which engages a worm wheel provided with a threaded bore threadedly engaging the lower end of the crowner turret supporting post 86 of Figure 2. Post 86 will be vertically movable but held against rotation so that rotation of the ring gear will cause post 86 and thereby the capping turret 85 to be raised or lowered, depending upon the direction of rotation of motor 184. Motor 184 will be reversible as hereinafter described.

A second driven shaft 224 also is journaled in bracket 192 parallel to the shafts 190 and 214. Shaft 224 has a pinion 226 fixed intermediate its ends and has a sprocket wheel 228 secured to one end. Sprocket 228 drives a sprocket chain 230 to thereby drive the infeed conveyor 24.

When the slidable collar 200 is in the position illustrated in Figure 11 to engage the pinion 226 on shaft 224, motor 184 will drive the conveyor 24. As is hereinafter explained, the controls of the machine are so arranged that motor 184 only can be operated to move conveyor 24 in an infeeding or forward direction, namely, from left to right as viewed in Figure 2.

When the yoke operating rod 208 is turned clockwise from the position illustrated in Figure 11, collar 200 will slide along shaft 190 to bring its pinion 202 into engagement with the pinion 216 on shaft 214 to thereby raise or lower the crowning or capping turret 85. The controls of the machine are so arranged so that when rod 208 and yoke 206 are in the last-described position, motor 184 may be driven in either direction to thereby either raise or lower the post 86 and crowning turret 85 to thereby permit the machine to handle runs of containers of different sizes.

As is indicated in the upper right hand portion of Figure 12, the capper supporting post 86 is provided with a longitudinally extending groove 231 in which the inner end of a pin 410 forming part of a Crowner Elevation Safety Switch 232 is engaged. At each end groove 231 is provided with a pocket 411 into which pin 410 will move if the post 86 is moved too far in either vertical direction. Inward movement of pin 410 will actuate circuits hereinafter described with the other control circuits of the machine.

CONTROL CIRCUITS

The control circuits of the machine are illustrated in Figure 12, the figure including diagrammatic showings of the various mechanisms of the machine actuated by the circuits.

Generally speaking, the selective control switch 265 illustrated in the central portion of Figure 12 enables the machine to be operated under two conditions. It will be noted that the shaft or rod shown in Figure 12 and with which the selective control switch 265 is movable is the same rod or shaft 208 which appears in Figure 11 as part of the gear shifting mechanism. Hence, the selective control switch 265 and the gear shifting mechanism of Figure 11 are operated together.

One condition hereinafter described under the heading "Filler Rotation Condition" is obtained by moving the operating handle 266 of selective control switch 265 to the left-hand or solid line position illustrated in Figure 12. Under this condition, the rotary filler can be driven by filler motor 36 and, because the gear shifting mechanism of Figure 11 is operated to the position illustrated in that figure, conveyor 24 can be driven by motor 184.

The other condition of operation may be described as "Elevation Control Condition." In this condition, the operating handle 266 of selective control switch 265 will be in the right-hand or dotted line position of Figure 12 and the gear shifting mechanism of Figure 11 will be in its right-hand position to thereby impart drive to the pinion 216 of lower driven shaft 214 to either raise or lower the capping mechanism turret 85. The direction of movement of the capping turret will depend upon the direction of rotation of the reversible motor 184.

The electrical circuit actuation which occurs under each of the above conditions is discussed below under appropriate headings, with paragraphs numbered to assist discussion.

Figure 12 includes a diagrammatic showing of the container infeed detector 26 shown in Figure 1. This detector is of conventional type and will be operated from the position indicated in Figure 12 to thereby break the controlling circuits and cause a signal to light in the event that containers become jammed at that portion of the conveyor 24. A similar detector is indicated in Figure 12 as outfeed detector 26a. Detector 26a will be positioned alongside the conveyor 24 just beyond the dial, not shown, which moves containers from the capping mechanism to conveyor 24.

Figure 12 also illustrates an oil level indicator or detector 245 comprising two mercury switches 330 and 385 mounted to pivot about an axis 246 fixed with respect to base 20. Movement of the switches about axis 246 is controlled by a float 331 responsive to the oil level in the lubricant well of the filler.

It will be understood that the diagrammatic showing of Figure 12 excludes the various fuses and overload controls which actually will be provided at various points in accordance with standard practice. Figure 12 shows all relay contacts in the position they occupy when the relay coils are de-energized.

As is indicated in the lower right-hand portion of Figure 12, the machine is supplied with 220 volt three phase alternating current through conductors 250, 251, and 252. The conductors 250 and 251 are connected by leads 254 and 255 to the primary of a step-down transformer, a switch 256 being included in the leads to the primary. The secondary of the transformer will produce a 110 volt output through its output leads 260 and 261.

*Filler rotation condition*

(1) If it is desired to start the rotary filler, viz., rotate filling table 32 and reservoir 38 together with the capping mechanism and various container moving dials, Selective Control Switch 265 of Figure 12 first must be operated to the "Conveyor Drive" position. This is accomplished by moving the operating handle 266 on gear shifting rod 208 of Figure 11 so that the handle 266 is in the left-hand or solid line position indicated in Figure 12. (Figure 11 shows gear shifter collar 200 in the position it will occupy when rod 208 and yoke 206 are in this position.) As is diagrammatically illustrated in Figure 12, rod 208 has a circular cam 267 fixed thereto. Cam 267 includes three rises 268, 269, and 270 which respectively control three movable switches, namely, a filler lock out switch 275, a shifter switch 276 and a reverse lock out switch 277. When the control switch 265 is in the conveyor drive position it occupies in filler rotation condition, the switches 275 and 276 will be closed, but reverse lockout switch 277 will be open, all as indicated in Figure 12.

(2) If the operator now presses the "forward or raise" contact 280 of the conveyor drive and crowner elevation control switch 281, the following circuit will be closed: From line 260 of the transformer secondary through the coil of relay R1 and thence by leads 416, 285, and 286 through the momentarily closed forward or raise contact 280, lead 287 to the normally closed stop contact 288 of switch 281, by lead 289 to the closed contact 276 of selective control switch 265, thence by lead 290, to a fixed contact 291 of the crowner elevation safety switch 232, across movable contact 292, which now must be in the outward position indicated in Figure 12, to a second fixed contact 293 and thence by leads 294 and 261 to the other secondary lead of the transformer.

(3) The closing of the circuit described in (2), above, will cause relay R1 to be energized so that the four contacts thereof will close. Three of these contacts, namely, the contacts 300, 301, and 302 are in leads 303, 304, and 305 of the 220 volt line and, therefore, current will be delivered to the conveyor driving and crowner elevating motor 184 to drive that motor in the proper direction to cause the infeed conveyor 24 to move in a forward or container feeding direction, namely, from left to right in Figure 2. In other words, because selective control switch 265 is in the conveyor drive position, and the gear shifting mechanism of Figure 11 is in the corresponding position illustrated in Figure 11, motor 184 will move conveyor 24 forward.

(4) The closing of the circuit mentioned in paragraph (2), above, will cause a holding circuit to be set up through the fourth contact 306 of relay R1, as follows: From transformer lead 260 through the coil of relay R1, thence by leads 416 and 308 to the contact 306 of relay R1, thence by leads 309, 394, and 287 through the normally closed stop contact 288 of switch 281, by lead 289 to closed contact 276 of selective control switch 265, by lead 290, to contacts 291, 292, and 293 of the crowner safety switch 232 and by leads 294 and 261 to the other side of the transformer secondary. Thus, the circuit to the motor 184 will be maintained even though the forward contact 280 of switch 281 is permitted to open. It will be observed that the above holding circuit will break and movement of conveyor 24 will stop if stop contact 288 of switch 281 is opened, if the selective control switch 265 is moved from the position illustrated in Figure 12, or if the crowner turret 85 should be so moved by hand to permit the crowner safety switch 232 to open.

(5) The closing and holding of the circuit described in paragraph (4), above, also will result in energizing conveyor and filler interlock relay R2 in parallel with the holding circuit of paragraph (4) as follows: From the lead 260 side of the coil of R1 and by lead 310 through the coil of relay R2 and thence by leads 311, 285, and 416 to the other side of the coil of relay R1. The normally open contact 312 of relay R2 thereby will be closed. However, no circuit will be completed through contact 312 until the filler switch 315 is operated as described in the immediately succeeding paragraph. Nevertheless, unless relay R2 is first closed, it is not possible to start rotation of the filler. As will subsequently appear, relay R2 will not be energized unless the selective control switch 265 is in the position illustrated in Figure 12 and unless the conveyor forward contact 280 has been closed to set up the circuits described in paragraphs (2), (3), and (4).

(6) If the operator now wishes to rotate the filler, the start contact 316 of filler switch 315 is closed, resulting in the following circuit through the filler motor control relay R4: By lead 260 from the transformer secondary, lead 317, through the coil of relay R4, by leads 317A and 318 through momentarily closed filler start contact 316, by lead 319 and normally closed stop contact 320 of filler switch 315, by lead 321 through a contact 322 forming part of the container outfeed detector 26a, by lead 323 to a contact 324 of the container infeed detector 26, by lead 325 to the float operated mercury switch 330 controlled by float 331 responsive to the oil level in the base 20 of the machine, then by lead 332 to the now closed contact 275 of selective control switch 265, by lead 333 through the contact 312 of relay R2 (closed by the circuit described in paragraph 5, above) and then by leads 334, 335, and 261 to the other side of the transformer secondary. Three contacts 250′, 251′, 252′ of R4 control supply of power to filler motor 36. Hence, when relay R4 is energized, filler motor 36 will drive filling table 32 with the reservoir, as well as rotate capping mechanism 78 and the container feeding dials. It will be noted that the circuit through the coil of relay R4 is controlled by the contact 312 of relay R2, so that if R2 is de-energized by the breaking of the circuit therethrough, the just-described circuit through R4 will open, and the filler motor 36 will cease operation.

(7) The closing of the circuit through the coil of relay R4 described in paragraph (6) will cause the following holding circuit to be closed through the coil of relay R4: From transformer secondary lead 260 and lead 317 through the coil of relay R4, leads 317A and 336 to the contact 337 of relay R4, lead 338 to normally closed stop contact 320 of filler switch 315 and thence by lead 321 of the outfeed detector switch 26a, the container infeed detector switch 26, the oil level switch 330 and the contact 275 of selective control switch 265 through the closed contact 312 of conveyor and filler interlock relay R2 to the lead 261 and the transformer secondary. It will be observed that neither the initiating circuit of paragraph (6) nor the holding circuit described in this present paragraph (7) can be closed unless relay R2 first has been energized by closing the conveyor forward contact 280. Also, the just-described circuits will not close if containers are jammed at either the infeed detector 26 or the outfeed detector 26a to thereby open the detector contacts 324 or 322, respectively. Moreover, if the level of the oil in the lubricant system of the machine is so low that float 331 causes the lubricant detector to rotate sufficiently in a clockwise direction that the mercury within switch 330 does not bridge both contacts, the above circuits will open. If the circuits open from any of these causes, relay R4 will de-energize, and the operation of filler motor 36 will stop.

(8) A vent control relay R5 is in parallel with the circuit closed through the coil of relay R4 described in paragraphs (6) and (7), above, the circuit through the coil of relay R5 being as follows: By lead 317 at one side of the coil of relay R4, leads 260 and 350, through manual switch 351, lead 352, through the coil of relay R5, leads 353, 354, 355, 318, and 317A to the opposite side of the coil of relay R4.

(9) The energization of relay R5 will cause the contact 360 of that relay to open, thereby breaking the following circuit through solenoid 150 which had been effective until this moment if transformer switch 256 and vent control switch 351 were closed: From the transformer lead 260, lead 350, switch 351, leads 352, and 361 through the coil of solenoid 150, lead 362, through contact 360 of relay R5 and leads 363 and 335 to lead 261 of the transformer. In short, starting the rotary filler de-energizes solenoid 150 of Figure 10 so that valve 148 will move to a position to permit compressed air to drain from above vent control diaphragm 102 of Figure 3, so that vent control disc valve 116 will be opened by spring 117 to place reservoir 38 in communication with the gas passages of the filling heads 42. Obviously, while the filler motor was stopped due to de-energization of relay R4, the contact 360 of relay R5 was closed so that the circuit last described through solenoid 150 was closed and, therefore, compressed air from line 140 held diaphragm 102 down and valve 116 closed so that no gas could vent from the containers to the reservoir. Hence, no beer could flow to the containers from the reservoir.

(10) The breaking of the circuit through contact 360 which takes place as described in paragraph (9) also breaks the following circuit through the solenoid 164 of Figures 1, 10, and 12: From lead 350 by lead 380, through a manual switch 381 to the lead 382 of solenoid 164 and thence by lead 383 to contact 360 of relay R5. The resultant de-energization of solenoid 164 will operate valve 162 of Figure 10 to relieve compressed air from the line 166 (Figure 1) so that the spring 175 within the automatic beer valve 48 will open that valve to permit beer to flow to the reservoir 38. Obviously, until 164 was de-energized, the flow of beer to reservoir 38 was cut-off. In short, starting filler motor 36 opens the beer supply line 46.

(11) As is indicated in Figure 12, indicating lamps are provided adjacent most of the mechanisms of the machine. For example, when the vent control solenoid 150 is energized, an indicating lamp will light. If bottles become jammed at the infeed detector 26 or the outfeed detector 26a, contacts associated with those detectors will cause lights to be illuminated at the same time that the contacts 324 and 322 of the respective detectors break the power circuit of the machine. Also, if the level of the oil in the lubricant chamber of the machine drops to a predetermined extent so that additional lubricant is required, but the level is not dangerously low, a mercury switch 385 will bridge its contacts to thereby close the circuit through a warning light 386. As has been previously described, if the level of the oil reaches a dangerous low condition, the circuit through mercury switch 330 will open to break the circuits through relays R4 and R5 and stop operation of the rotary filler motor 36. Obviously, whenever relays R4 and R5 de-energize, solenoids 150 and 164 will energize and flow of liquid to reservoir 38 and from reservoir 38 to the filling heads immediately will stop.

(12) When relay R4 is energized as described in paragraph (6), above, the blowout control solenoid 180 also will energize in parallel with relay R4 as follows: From the lead 317 at one side of relay R4 by leads 364, and 365, through manual switch 366, and lead 367 to a bimetallic switch 368, by lead 369 through the coil of solenoid 180 and by leads 370, 355, 318, and 317A to the other side of the coil of relay R4. It will be observed that a heating element 375 is connected across the leads 367 and 370 so that current will flow through heater 375 when coil 180 is energized. The energization of solenoid 180 will cause the valve 178 of Figures 1, 10, and 12 to be operated to open position so that compressed air may flow through the valve 178 from compressed air line 140 to line 182 to thereby move the blow-out trip 82 to actuating position. Hence, as the disc valve 64 of each filling head 42 comes adjacent trip 82, the disc valve will be operated to blow-out position to cause gas from reservoir 38 to blow through the gas and air flow lines of the filling head. Immediately thereafter, the upper arm of the disc valve will contact the closing trip 84 of Figure 2 to restore the disc valve to closed or neutral position. The bimetallic switch 368 will be so adjusted that heater 375 will cause the bimetallic switch to open after a predetermined time interval and then stay open. For example, if one complete rotation of the filling table 32 requires but twelve seconds, bimetallic switch 368 will be opened by the heat from heater 375 when the rotary filler has been rotating for twelve seconds so that every filling head has been blown out. This will de-energize solenoid 189 so that valve 178 will move to its other position and exhaust the pressure behind trip 82 so that it will move to non-actuating position. Hence, blow-out will stop.

(13) If it is desired to stop the rotary filler, the filler stop switch 320 may be opened, thereby opening the holding circuit described in paragraph (7). However, the circuits described in paragraph (4) will still remain closed, and conveyor 24 will continue to move beneath the containers stopped at dial 28. Operation of the filler may be restarted by again pressing the filler start contact 316. If the stop contact 288 of conveyor drive and crowner elevation control switch 281 is opened, all of the circuits described above to power the motors 36 and 184 will open. Obviously, if either of the stop switches 288 or 316 is opened, or if relay R4 is de-energized by any cause, the contact of relay R5 will close and the solenoids 150 and 164 will close the vent control valves 116 and the beer supply valve 48.

Crowner elevation condition

(14) Assuming that the filler is not rotating, if it is desired to change the position of the crowning turret 78, the selective control switch 265 will be operated by moving its handle 266 to the right-hand or dotted line position of Figure 12. As has been indicated above in connection with Figure 11, this will cause the shifter pinion 202 to move into engagement with the pinion 216 included in the elevating drive of the capping turret. This operation of the selective control switch 265 also will cause all of the contacts 275, 276, and 277 to open while cam 267 is being rotated. However, at the conclusion of the movement to the right-hand position, contact 276 will be re-closed because rise 268 will be beneath it. No rise will be beneath the contacts 275 and 277 and, therefore, contact 275 will open but contact 277 will move inwardly against its fixed contacts.

(15) If the lowering contact 389 of switch 281 is now closed, the relay R3 will be energized through the following circuit: From the transformer lead 260 to lead 390, coil of relay R3, leads 391 and 392 through now closed contact 277 of selective control switch 265, lead 393 to momentarily closed contact 389, leads 394 and 287 to normally closed stop contact 288, lead 289, the now closed contact 276 of switch 265, lead 290 to contact 291 of the crowner safety switch 232, across contact 292 to fixed contact 293 and by leads 294 and 261 to the other side of the transformer. The energization of relay R3 will cause all of its contacts to close. The three contacts 397, 398, and 399 are in the 220 volt conductors 401, 402, and 403 which are so connected to the conveyor driving and crowner elevating motor 184 as to cause that motor to be driven in the opposite direction in which it was driven when driving the conveyor 24. In its new direction, the motor 184 will cause the crowner turret 78 to be lowered.

(16) Closing of the just-described circuit through relay R3 will cause the following holding circuit to be closed through the fourth contact 405 of that relay: By transformer lead 260 and lead 390 through the coil of relay R3, thence by leads 391 and 406 to contact 405, leads 407, 389, 394, and 287 through stop contact 288, lead 289, contact 276 of selective control switch 265, lead 290 to the fixed contact 291 of crowner safety switch 232 and by the movable contact 292 to fixed contact 293 and by leads 294 and 261 to the other side of the transformer secondary.

(17) Should the crowner be lowered to such an extent that the pin 410 of safety switch 232 comes opposite the upper pocket 411 on the crowner post 86, contact 292 will move toward post 86 and away from the contacts 291 and 293 thereby breaking the holding circuit described immediately above so that motor 184 will stop operation. The inward movement of contact 292 will bridge the inner fixed contacts 412 of switch 232 so that the warning lamp 415 will be illuminated.

(18) If it is desired to raise the capping turret 78, the forward or raise contact 280 of conveyor drive and crowner elevation control switch 281 will be closed to energize relay R1 through the following circuit: From transformer lead 260 through the coil of relay R1, leads 416, 285 and 286 to momentarily closed contact 280, lead 287 to stop contact 288, lead 289 to contact 276 of switch 265, lead 290 to fixed contact 291 of crowner safety switch 232, movable contact 292, fixed contact 293, and leads 294 and 261 to the other side of the transformer secondary.

(19) The closing of the circuit described in (18) will also set up the following holding circuit through relay R1: Transformer lead 260 through the coil of relay R1, leads 416 and 308 to contact 303 of relay R1 leads 309, 394, and 287 to stop contact 288, lead 289, contact 276, and lead 290, and thence through the crowner safety switch to the other transformer lead 261.

(20) If the capping turret is raised too high, the position of safety switch contact 292 will change to break the holding circuit described above, motor 184 will cease operation, and the warning light 415 will be illuminated. Vertical movement of the capping turret obviously can be stopped by opening stop contact 288.

The terminology used in the specification is for the purpose of description and not of limitation, the scope of the invention being defined in the claims.

We claim:

1. In a container filling machine, a base, a reservoir for a body of carbonated liquid and a superposed body of gas under pressure rotatable with respect to said base about a vertical axis, a plurality of filling heads each including a liquid outlet which is connected to the liquid containing portion of said reservoir, container supporting means associated with said filling heads, said filling heads and container supporting means being rotatable with said reservoir, gas return flow line means extending from each filling head of said reservoir, valve means in each of said filling heads to control gas and liquid flow therethrough, means to rotate said reservoir, means to stop operation of said last-named means, normally open additional valve means operable to close the gas return flow line means of each filling head from said reservoir and from the gas return flow line means of at least the major number of the other filling heads, and means operable with said operation stopping means to close said additional valve means.

2. In a container filling machine, a base, a reservoir for a body of carbonated liquid and a superposed body of gas under pressure rotatable with respect to said base about a vertical axis, a plurality of filling heads each including a liquid outlet which is connected to the liquid containing portion of said reservoir, container supporting means associated with said filling heads, said filling heads and container supporting means being rotatable with said reservoir, a liquid supply line connected to said reservoir, a normally open valve in said supply line, means to rotate said reservoir, means to stop operation of said last-named means, and means operable with said operation stopping means to close said liquid supply line valve.

3. In a container filling machine, a base, a reservoir for a body of carbonated liquid and a superposed body of gas under pressure rotatable with respect to said base about a vertical axis, with a plurality of filling heads each including a liquid outlet which is connected to the liquid containing portion of said reservoir, container supporting means associated with said filling heads, said filling heads and container supporting means being rotatable with said reservoir, gas return flow line means extending from each filling head to said reservoir, valve means on each of said filling heads to control gas and liquid flow therethrough, a liquid supply line connected to said reservoir, means to rotate said reservoir, means to stop operation of said last-named means, and normally open additional valve means operable to close said liquid supply line and the gas return flow line of each filling head, and means operable with said operation stopping means to close said additional valve means.

4. In a container filling machine, a base, a reservoir for a body of carbonated liquid and a superposed body of gas under pressure rotatable with respect to said base about a vertical axis, a plurality of filling heads each including a liquid outlet which is connected to the liquid containing portion of said reservoir, container supporting means associated with said filling heads, said filling heads and container supporting means being rotatable with said reservoir, gas return flow line means extending from each filling head to said reservoir, filling head control means to operate said filling heads to open said gas return passages to atmosphere, means to rotate said reservoir, means to start operation of said last-mentioned means, and means operable with said operation starting means to cause said filling head control means to be operative.

5. In a container filling machine, a base, a reservoir for a body of carbonated liquid and a superposed body of gas under pressure rotatable with respect to said base about a vertical axis, a plurality of filling heads each including a liquid outlet which is connected to the liquid containing portion of said reservoir, container supporting means associated with said filling heads, said filling heads and container supporting means being rotatable with said reservoir, gas return flow line means extending from each filling head to said reservoir, means to place containers on said container supporting means and means to remove containers from said container supporting means so that during a given travel path said container supporting means will support no containers, filling head actuating means positioned in the said given travel path to actuate said filling heads to open said filling head gas return passages to atmosphere, means to rotate said reservoir, means to start said last-named means, and means operable with said rotation starting means to cause said filling head actuating means to be operative.

6. A container filling machine of the character described in claim 5 including means effective after a predetermined time to render said filling head actuating means inoperative.

7. In a container filling machine including a base, container delivery conveyor means, a rotatable cap applying mechanism, means to move said cap applying mechanism vertically with respect to said base, driving means, and selectively operable means to connect said driving means either to said conveyor means or to said means to move the cap applying mechanism vertically.

8. In a container filling machine including a base, a rotatable reservoir and a plurality of filling heads, container delivery conveyor means, means to rotate said reservoir, a rotatable cap applying mechanism, means to move said cap applying mechanism vertically with respect to said base, driving means, and selectively operable means to connect said driving means either to said conveyor means and said reservoir rotating means or to said means to move the cap applying mechanism vertically.

9. In a container filling machine, a base, a reservoir including filling head and container supporting platforms rotatable as a unit with respect to said base about a vertical axis, a journal vertically movable with respect to said base, a capping mechanism rotatable about said journal and above said base, a conveyor movable across said base to supply containers to said platforms, means to drive said conveyor, means to move said journal vertically with respect to said base, a first power means to drivingly rotate said reservoir, a second power means, and selectively operable means to either connect said second power means to said conveyor driving means or to said means to move said journal vertically.

10. A container filling machine of the character described in claim 9 including means to render said first power means inoperative when said second power means is connected to said means to move said journal vertically.

11. A container filling machine of the character described in claim 9 including means to hold said first power means inoperative until said second power means is connected to said conveyor driving means.

12. A container filling machine of the character described in claim 9 wherein said journal is a post.

13. A container filling machine of the character described in claim 9 wherein said journal is a post threaded at its lower portion and said means to move the journal vertically includes a rotatable nut engaging the post threads.

14. A container filling machine of the character described in claim 9 including means to render said journal moving means inoperative after predetermined vertical movement of said journal.

15. In a rotary filling machine, a base, a rotary filler, a conveyor to deliver containers to the filler, a capping mechanism, means to vertically move said capping mechanism with respect to said base, a first motor, a second motor, and means to selectively connect said first motor to said filler and connect said second motor to said conveyor, or connect said second motor to said capping mechanism moving means, including a power source, a controlling element movable between two limit positions, first and second lockout switches respectively closed in the limit positions of said controlling element, a third switch closed in each limit position of said element, first, second, third and fourth relays including contacts closed by energization of the relay coils, the contacts of said first and third relays controlling circuits between said power source and said second motor, the contacts of said fourth relay controlling circuits between said power source and first motor, said first and second relay coils being in circuit with said third switch when the latter is closed, a first power switch movable to close a circuit through said third switch and the coils of said first and second relays, to thereby connect said power source to said second motor to operate said conveyor in container feeding direction, a second power switch movable to closed position to close a circuit through the coil of said fourth relay, the contact of said second relay and said first lockout switch when the latter is closed, to thereby connect said power source to said first motor, said first power switch being operable when said second lockout switch is closed to selectively energize the coils of said first or third relays to close circuits between said power means and said second motor to drive said capping mechanism elevating means.

16. A rotary filling machine of the character described in claim 15 wherein said controlling element is a rotary cam.

17. A rotary filling machine of the character described in claim 15 including gear shifting mechanism selectively operable to connect said second motor to said conveyor or to said capping mechanism elevating means.

18. A rotary filling machine of the character described in claim 15 including gear shifting mechanism selectively operable with said controlling element, said gear shifting mechanism being operable to connect said second motor to said conveyor or to said capping mechanism elevating means.

19. A rotary filling machine of the character described in claim 15 wherein said rotary filler includes means to stop the flow of liquid to the containers, and means controlled by said fourth relay to render said flow stopping means effective when said fourth relay is de-energized.

20. A rotary filling machine of the character described in claim 15 including means to supply liquid to said rotary filler, valve means to control flow through said supply means, and means controlled by said fourth relay to cause said valve means to close when said fourth relay is de-energized.

21. A rotary filling machine of the character described in claim 15 wherein said third switch is closed only in each limit position of said controlling element.

22. A rotary filling machine of the character described in claim 15 wherein said rotary filler includes a reservoir and filling heads, and means rendered operative to open said reservoir to atmosphere through said filling heads, by energization of said fourth relay.

23. A rotary filling machine of the character described in claim 22 wherein said means rendered operable by said fourth relay will become inoperative independently of said fourth relay after a predetermined time interval.

24. A rotary filling machine of the character described in claim 15 including means actuated by said capping mechanism moving means to open the circuit through the coil of said first relay upon predetermined vertical movement of said capping mechanism.

25. A rotary filling machine of the character described in claim 15 including means responsive to jamming of containers on said conveyor, and means actuated by said means to open the circuit through the coil of said fourth relay upon the occurrence of a container jam.

26. A rotary filling machine of the character described in claim 15 wherein the base of the machine includes an oil chamber, and means responsive to the level of oil in said chamber to control the coil circuit of said fourth relay.

References Cited in the file of this patent

UNITED STATES PATENTS

| Number | Name | Date |
| --- | --- | --- |
| 2,118,436 | Kantor | May 24, 1938 |
| 2,202,033 | Stewart et al. | May 28, 1940 |